United States Patent [19]

Starnes, Jr.

[11] 4,098,763

[45] Jul. 4, 1978

[54] TECHNIQUE FOR STABILIZATION OF VINYL CHLORIDE POLYMERS USING ORGANIC THIOLS

[75] Inventor: William Herbert Starnes, Jr., Roselle Park, N.J.

[73] Assignee: Bell Telephone Laboratories, Incorporated, Murray Hill, N.J.

[21] Appl. No.: 721,239

[22] Filed: Sep. 8, 1976

[51] Int. Cl.$^2$ .............. C08F 6/00; C08J 3/00
[52] U.S. Cl. .................. 260/45.7 S; 526/17; 526/30; 526/37; 528/487
[58] Field of Search .......... 526/17, 30; 260/45.7 S, 260/79.5 NV, 79.5 C; 528/487

[56] References Cited

U.S. PATENT DOCUMENTS

| | | | |
|---|---|---|---|
| 2,543,867 | 3/1951 | Pritchard | 260/79.5 C |
| 2,691,008 | 10/1954 | Grim | 528/487 |
| 2,979,488 | 4/1961 | Carpenter | 526/30 |
| 3,004,949 | 10/1961 | Chevassus | 260/45.7 S |
| 3,008,916 | 11/1961 | Smith | 526/30 |
| 3,041,304 | 6/1962 | Gardner et al. | 526/30 |
| 3,240,771 | 3/1966 | Blazejak et al. | 528/487 |
| 3,655,618 | 4/1972 | Weil | 260/47 UP |
| 3,875,084 | 4/1975 | Weil | 260/79.5 C |
| 4,016,332 | 4/1977 | Anderson et al. | 260/79.5 NV |
| 4,016,350 | 4/1977 | Smith et al. | 260/45.7 S |

FOREIGN PATENT DOCUMENTS

| | | | |
|---|---|---|---|
| 678,032 | 1/1964 | Canada | 260/45.7 S |
| 39-1813 | 2/1964 | Japan | 260/45.7 S |

OTHER PUBLICATIONS

Chemical Abstracts, vol. 61, No. 13, Dec. 21, 1964, pp. 16256h and 16257a.

*Primary Examiner*—Ronald W. Griffin
*Attorney, Agent, or Firm*—Edward M. Fink

[57] ABSTRACT

A technique is disclosed for the preparation of stable vinyl chloride polymers. The technique involves reacting a vinyl chloride polymer in solution with an organic thiol compound, precipitating the polymer from solution and subjecting it to solvent extraction.

6 Claims, No Drawings

TECHNIQUE FOR STABILIZATION OF VINYL CHLORIDE POLYMERS USING ORGANIC THIOLS

This invention relates to a technique for the preparation of stabilized vinyl chloride polymers. More particularly, the present invention relates to the preparation of vinyl chloride polymers stabilized against nonoxidative degradation by reaction with an organic thiol compound.

Vinyl chloride polymers and copolymers are known to deteriorate under the influence of heat, so resulting in alteration of the physical properties thereof and discoloration which precludes use in lightly colored or transparent articles. This thermal nonoxidative degradation involves the sequential loss of hydrogen chloride from adjacent monomer units and results in the formation of conjugated polyene structures which impart undesirable color to the vinyl chloride polymer.

Efforts to obviate these limitations have typically involved the use of stabilizing compositions of the $MY_2$ type wherein M is a metallic cation, for example, $R_2Sn^{+2}$ (R is usually an alkyl group), $Ba^{+2}$, $Cd^{+2}$, $Zn^{+2}$, $Pb^{+2}$, $Ca^{+2}$, etc., and Y is an organic anion. The most effective stabilizers from this class of compounds are the organotin compounds, particularly those containing tin-sulfur bonds. It has been theorized that these $MY_2$ stabilizers react with hydrogen chloride and since hydrogen chloride is known to catalyze polyvinyl chloride (PVC) degradation, the efficacy of these stabilizers is due, in part, to hydrogen chloride scavenging. However, these stabilizers are also believed to have the ability to undergo rapid and selective metathetical reactions which destroy certain polyvinyl chloride structural anomalies that are the active degradation sites. Accordingly, in addition to reducing the rate of color development in polyvinyl chloride by interrupting the growth of polyenes, the $MY_2$ stabilizers should manifest a true chemical stabilization effect by reducing the rate of formation of total chloride.

Despite conflicting theories advanced by workers in the art, relative to the described stabilization mechanism, the $MY_2$ stabilizers and, particularly, the organotin mercaptides have been used extensively in industry. Although considered satisfactory from the standpoint of stabilization, toxicity of the heavy metal residues and ecological considerations have stimulated further evaluation of such compositions and generated a search for alternative approaches.

In accordance with the present invention, this end has been attained by means of a novel process which yields a polymeric product that is free from the toxic heavy metal containing residues characteristic of the prior art. Additionally, the vinyl chloride polymers prepared in accordance with the invention evidence greatly enhanced stability with respect to the unstabilized composition and which is comparable to that provided by most prior art stabilizers for vinyl chloride polymers.

Briefly, the present invention involves heating a vinyl chloride polymer sample in solution with an organic thiol compound, precipitating the vinyl chloride polymer from the reaction product and subjecting the resultant precipitate to solvent extraction to remove unreacted thiol.

The vinyl chloride polymers described herein are prepared by reacting the polymer in solution with an organic thiol of the formula $R_1SH$ wherein $R_1$ is selected from the group consisting of (a) alkyl groups having from 8-14 carbon atoms, (b) an α-naphthyl group, (c) a β-naphthyl group, (d) a substituted aryl group of the formula

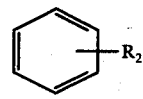

wherein $R_2$ is selected from the group consisting of hydrogen, alkyl groups of 1-4 carbon atoms, alkoxy groups of 1-4 carbon atoms, chlorine, and bromine, and (e) $HS(CH_2)_n$, where $n$ is an integer from 6-10. Compositions found to be particularly useful for this purpose are n-dodecanethiol, 1,8-octanedithiol, benzenethiol, p-methylbenzenethiol, p-methoxybenzenethiol, p-chlorobenzenethiol, α-naphthalenethiol, β-naphthalenethiol, and the like. The organic thiol compound employed in the practice of the present invention is used in an amount ranging from 1-20 grams per gram of vinyl chloride polymer, the minimum and maximum values being dictated by practical considerations.

As noted, reaction is effected in solution, a large excess of stabilizer being employed. The solvent selected must readily dissolve vinyl chloride polymer and should evidence a boiling point in excess of 160° C. Organic solvents suitable for this purpose include o-dichlorobenzene, ethyl benzoate, methyl benzoate and the like.

In the operation of the process, the reaction mixture comprising vinyl chloride polymer (obtained from commercial sources and having a number-average molecular weight ranging from 30,000–100,000) in solution and from 1-20 grams of organic thiol per gram of polymer is heated to a temperature within the range of about 160°–185° C for a time period ranging from about 150 to 18 hours, the longer time periods corresponding with the lower temperature and the converse. However, use of the longer time periods with the higher reaction temperatures does not have an adverse effect upon the results. The solvent employed eliminates stabilizer dispersion difficulties encountered in solid phase systems. Lastly, reaction is desirably effected in the presence of a nonreactive or inert gas, argon, nitrogen, neon and the like being found suitable for such purposes.

Following, the reaction mixture is cooled and the vinyl chloride polymer precipitated therefrom. Cooling is continued until a temperature less than the boiling point of the solvent selected for use in the precipitation process is attained. Solvents suitable for this purpose include the lower alkanols containing from 1-6 carbon atoms, as for example, methanol, ethanol and isopropanol. The solvent is added to the reaction mixture until such time as no further polymer precipitation is observed, and the polymer is then recovered by filtration. The filtrate produced in this operation comprises o-dichlorobenzene, the precipitation solvent, unchanged thiol, and any soluble by-products formed during the reaction.

The polymer recovered is then subjected to a conventional solvent extraction operation utilizing any of the lower alkanols ($C_1$–$C_6$) as the solvent. Conveniently, this process is effected with hot alkanol over a 24 hour period. Finally, the recovered vinyl chloride polymer is dried and analyzed.

The basic aspects of the invention having been described, reference is made to the following illustrative embodiments. It will be appreciated by those skilled in the art that such embodiments are for purposes of exposition only and are not to be construed as limiting.

EXAMPLE 1

The stabilization process was effected in a three-necked round bottom flask heated by a thermostatically controlled oil bath equipped with a reflux condenser connected to a pressure release valve, a ground glass stopper and an inert gas fritted disc bubbler.

n-Dodecanethiol was added to o-dichlorobenzene (100 ml/gram of polymer) and the mixture stirred rapidly while admitting argon into the system and adjusted to a temperature of approximately 182° C (by means of the oil bath) during a 1 hour period. Following, the flask was unstoppered and vinyl chloride polymer admitted to the system in an amount sufficient to yield a mixture containing 6.7 grams of thiol per gram of vinyl chloride polymer. Complete dissolution of the polymer occurred within five minutes. The reaction mixture was heated at 182° C for 19 hours and then cooled to a temperature of approximately 60° C with continued introduction of inert gas. The reaction product was next poured into methanol (2.33 ml/ml of o-dichlorobenzene) to yield a heterogeneous mixture which was vigorously agitated through the course of the addition. After several minutes of stirring, the precipitated vinyl chloride polymer was recovered by suction filtration and washed several times on the fritted glass filter with fresh methanol. The polymer was then subjected to Soxhlet extraction with hot methanol for 24 hours and dried overnight prior to analysis. The rate constant for polyvinyl chloride dehydrochlorination under argon was then determined and found to be $4.9 \times 10^{-6}$ mols of hydrogen chloride per gram of polyvinyl chloride per hour at 160.5° C.

The dehydrochlorination was carried out in a glass reaction vessel, the vinyl chloride polymer being admitted thereto in powder form in a thin uniform layer. The vessel was initially degassed by passing argon therethrough for 20 minutes at room temperature and the vessel subsequently immersed in a thermostated oil bath previously adjusted to the desired dehydrochlorination temperature. Gas exiting from the reactor was bubbled through a capillary tube into a magnetically stirred vessel containing distilled water, the pH of the water being continuously monitored. A time period of 15 minutes was allowed for thermal equilibration and kinetic points were taken at appropriate intervals by titrating the dissolved hydrogen chloride with 0.0100 N sodium hydroxide solution. The plot of amounts of added caustic against time showed auto-acceleration initially and then linearity. The value of the rate constant was then calculated from the straight line fitted to the linear portion of the curve by visual inspection.

The procedure of Example 1 was repeated varying the amount and nature of additive, reaction time and reaction temperature. The results are set forth in the following table.

TABLE

| Example | Additives g/g of PVC | Reaction Temperature,$^a$ ° C | Reaction Time, Hr. | $\left(\dfrac{\text{Mol HCl}}{\text{g PVC–hr}}\right)10^6$ |
|---|---|---|---|---|
| 1 | n-Dodecanethiol (6.7) | 182 | 19 | 4.9 |
| 2 | n-Dodecanethiol (6.7) | 185 | 144 | 3.2 |
| 3 | n-Dodecanethiol (20) | 182 | 72 | 2.8 |
| 4 | n-Dodecanethiol (20) | 180 | 144 | 1.4 |
| 5 | t-Dodecanethiol (12) | 185 | 74 | 4.1 |
| 6 | 1,8-Octanedithiol (5.9) | 186 | 19 | 5.6 |
| 7 | Benzenethiol (3.6) | 186 | 19 | 4.8 |
| 8 | p-methylbenzenethiol (4.1) | 184 | 20 | 5.4 |
| 9 | p-methoxybenzenethiol (4.6) | 184 | 19 | 7.0 |
| 10 | p-chlorobenzenethiol (4.8) | 184 | 19 | 7.1 |
| 11 | α-naphthalenethiol (5.3) | 184 | 19 | 4.4 |
| 12 | β-naphthalenethiol (5.3) | 182 | 19 | 4.5 |
| 13 | Control (no additive) | 184 | 19 | >48 |
| 14 | Control (no additive or heat treatment) | | | $10.4 \pm 0.6^b$ |

$^a \pm 3°$
$^b$ average of several runs

Analysis of the results set forth in the table reveal that the desired chemical stabilization is achieved. Example 13 is a control experiment in which organic thiol compounds are not added to the vinyl chloride polymer which is heated in an o-dichlorobenzene solution to a temperature of 184° C for a time period of 19 hours. As noted, the stabilization effect is nil. Example 14 relates to a control in which no additives or heat treatment are given to the vinyl chloride polymer.

What is claimed is:

1. In the method for the preparation of a stable vinyl chloride polymer which comprises reacting a polyvinyl chloride polymer having a number average molecular weight ranging from 30,000 to 100,000 with an organic compound, adding a solvent to the reaction mixture to effect polymer precipitation, and subjecting the polymer to solvent extraction to yield the desired polymer, the improvement which comprises effecting said reaction at a temperature within the range of 160°–185° C for a time period ranging from 150 to 18 hours, the longer time periods corresponding with the lower temperatures and the converse, the organic compound being a thiol of the formula $R_1SH$ wherein $R_1$ is selected from the group consisting of (a) alkyl groups of 8–14 carbon atoms, (b) an α-naphthyl group, (c) a β-naphthyl group, (d) a substituted aryl group of the formula

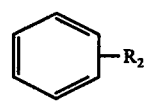

wherein $R_2$ is selected from the group consisting of hydrogen, alkyl groups of 1–4 carbon atoms, alkoxy groups of 1–4 carbon atoms, chlorine and bromine, and (e) $HS(CH_2)_n$ wherein $n$ is an integer from 6–10, the resultant polymer being free of chemically bound and occluded sulfur.

2. Technique in accordance with claim 1 wherein said organic thiol compound is n-dodecanethiol.

3. Technique in accordance with claim 1 wherein said organic thiol compound is 1,8-octanedithiol.

4. Technique in accordance with claim 1 wherein said organic thiol compound is benzenethiol.

5. Technique in accordance with claim 1 wherein said organic thiol compound is p-methylbenzenethiol.

6. Technique in accordance with claim 1 wherein said organic thiol compound is α-naphthalenethiol.

* * * * *